July 30, 1957 E. P. FELCH 2,801,337

CRYSTAL OSCILLATOR APPARATUS

Filed Aug. 19, 1953 8 Sheets-Sheet 1

INVENTOR
E. P. FELCH
BY W. J. O'Neill
ATTORNEY

INVENTOR
E. P. FELCH
BY W. J. O'Neill
ATTORNEY

CRYSTAL OSCILLATOR APPARATUS

INVENTOR
E. P. FELCH
BY W. J. O'Neill
ATTORNEY

July 30, 1957 E. P. FELCH 2,801,337

CRYSTAL OSCILLATOR APPARATUS

Filed Aug. 19, 1953 8 Sheets-Sheet 4

INVENTOR
E. P. FELCH
BY
W. J. O'Neill
ATTORNEY

July 30, 1957 E. P. FELCH 2,801,337

CRYSTAL OSCILLATOR APPARATUS

Filed Aug. 19, 1953 8 Sheets-Sheet 5

INVENTOR
E. P. FELCH
BY
W. J. O'Neill
ATTORNEY

July 30, 1957 E. P. FELCH 2,801,337

CRYSTAL OSCILLATOR APPARATUS

Filed Aug. 19, 1953 8 Sheets-Sheet 6

INVENTOR
E. P. FELCH
BY W. J. O'Neill
ATTORNEY

CRYSTAL OSCILLATOR APPARATUS

Filed Aug. 19, 1953

8 Sheets-Sheet 7

INVENTOR
E. P. FELCH
BY W. J. O'Neill
ATTORNEY

July 30, 1957 E. P. FELCH 2,801,337

CRYSTAL OSCILLATOR APPARATUS

Filed Aug. 19, 1953 8 Sheets-Sheet 8

INVENTOR
E. P. FELCH
BY W. J. O'Neill
ATTORNEY

United States Patent Office 2,801,337 Patented July 30, 1957

2,801,337

CRYSTAL OSCILLATOR APPARATUS

Edwin P. Felch, Chatham, N. J., assignor to Bell Telephone Laboratories, Incorporated, New York, N. Y., a corporation of New York Application August 19, 1953, Serial No. 375,245

8 Claims. (Cl. 250—36)

This invention relates to oscillation generators and particularly to sub-harmonic frequency oscillation generators under control of piezoelectric or other precision frequency control elements which may be utilized as primary frequency standards and for other purposes.

One of the objects of this invention is to generate oscillations of great constancy.

Another object of this invention is to generate constant frequency oscillations under control of a piezoelectric crystal but at a frequency other than the operating resonant frequency of the crystal.

A still further object of this invention is to generate constant frequency oscillations having a frequency lower than the frequency limit for an economically feasible or practical piezoelectric element.

Another object of this invention is to generate output circuit oscillations of one frequency controlled by a piezoelectric body of a different frequency wherein such frequencies are converted and interlocked in the oscillating loop circuit.

A particular object of this invention is to generate oscillations precisely controlled by a piezoelectric crystal with most of the circuit elements other than the crystal operating at frequencies lower than that of the crystal whereby greatly improved circuit element stability may be attained.

Another particular object of the invention is to generate oscillations precisely controlled by a piezoelectric crystal in a circuit including only modulators at the crystal frequency in order to realize the stability advantages of modulators combined with high frequency amplifiers.

The generation of relatively low frequency currents under control of piezoelectric crystal bodies operating at their resonant frequencies has often been avoided because of several physical and economic limitations. Low frequency crystal units are relatively large and may require large ovens for their temperature control. The large size also mitigates against use in aircraft or other mobile equipment. The large size requires large perfect quartz crystals from which to cut the resonant body and such quartz crystals are relatively scarce and costly. Crystal units for higher operating frequencies having equivalent stabilities have been developed and may be used for the production of low frequencies having a subharmonic or lower frequency relation to the operating frequency of the high frequency crystal unit.

Heretofore the generation of relatively low frequency output circuit oscillations under control of a higher frequency crystal body has been difficult. In one known system, a piezoelectric controlled oscillator controls subharmonic oscillators in one or more separate stages to attain a desired low frequency, the subharmonic generators requiring precise amplitude maintenance in the control frequency to avoid phase shift in the low frequency. In another known system, the low frequency is produced by beats between two high frequency crystals, wherein the low frequency thereby secured cannot have the stability of the high frequency crystals unless both crystals always experience identical variations with temperature and voltage changes.

In accordance with this invention, a generator of relatively low frequency oscillations under control of a single piezoelectric crystal body operating at high frequency may be provided which avoids the abovementioned disadvantages. As an example, the circuit may generate an output frequency of 100 kilocycles per second under control of a single quartz crystal resonant at 5 megacycles per second which crystal may be relatively inexpensive to manufacture, which may have a low temperature coefficient of frequency, and which may be relatively small and rugged so that use may be made of its small size and rugged construction for portable and other equipment. At the same time, the final output frequency of 100 kilocycles per second may approach or have the same stability expressed percentagewise as that of the crystal unit itself having the frequency of 5 megacycles per second. In such an arrangement, the circuit provided in accordance with applicant's invention generates the final desired output low frequency oscillations by a beat-down system in a heterodyne modulator or heterodyne detector wherein the heterodyne or beat frequency voltage is not separately generated but is generated in the same loop circuit under control of the high frequency crystal body. In this arrangement, the loop circuit of the primary high frequency oscillator in conveying energy from the output terminals of the crystal unit to the input terminals thereof converts that energy at one point in the loop circuit to the desired low frequency oscillations, and at a later point in the loop circuit converts the energy at the low frequency back to the original high frequency for delivery to the input terminals of the crystal unit.

For example, applicant may provide an oscillator in which all frequencies involved are under control of a quartz crystal unit resonating at 5 megacycles per second. Current at the crystal frequency of 5 megacycles per second passes from the output terminals of the crystal unit to a modulator where it beats with a heterodyne frequency of either 4.9 or 5.1 megacycles per second thereby generating a resultant frequency of 0.1 megacycle per second which passes not only to a utility or output circuit, but also in part passes to a second modulator where it beats with the same heterodyne frequency thereby giving the original frequency of 5 megacycles per second which is then delivered to the input terminals of the crystal unit, resulting in sustained generation of both frequencies of 5 megacycles and 0.1 megacycle per second in the same loop circuit. The heterodyne frequency may be generated from the 0.1 megacycle per second low frequency by a suitable frequency multiplying harmonic generator. The 0.1 megacycle per second low frequency is thus entirely dependent upon the controlling high frequency crystal body and may possess the constancy and stability of the 5 megacycles per second frequency crystal unit.

Accordingly, the oscillator provided in accordance with this invention may consist generally of a regenerative frequency divider, a modulator deriving its carrier from the divider, and a frequency controlling piezoelectric crystal body, all included in the oscillating loop. The crystal frequency and the output circuit frequency being interlocked in such an arrangement, the output circuit frequency cannot change unless the crystal frequency changes, and hence the circuit may be utilized to provide a high degree of frequency stability. Also, in such a system, two very significant advantages are that the gain needed to cause oscillations may be obtained at the low frequency where phase shifts which affect the oscillator frequency may be more readily controlled, and also that the crystal may operate between modulators where the influence of electron tube parameters on the frequency of oscillation may be reduced.

Another important feature is that the circuit includes the frequency conversion in the oscillating feedback loop circuit. Since the primary oscillating loop circuit includes both the crystal frequency and the output circuit frequency, the latter frequency is dependent upon and locked to the crystal frequency and the crystal body may control the output frequency and the phase shift of the circuit voltage, the circuit factors and parameters being suitably controlled to realize a desired degree of phase stability.

For a clearer understanding of the nature of this invention and the additional advantages, features and objects thereof, reference is made to the following description taken in connection with the accompanying drawing, in which like reference characters represent like or similar parts and in which.

Figure 3:
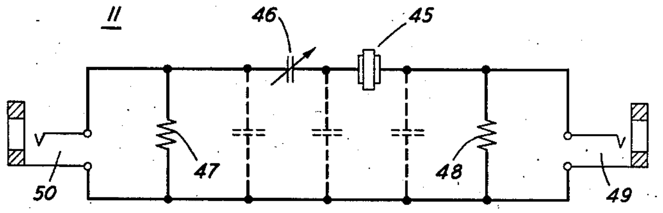
Figure 10:
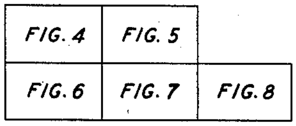
Figure 2:
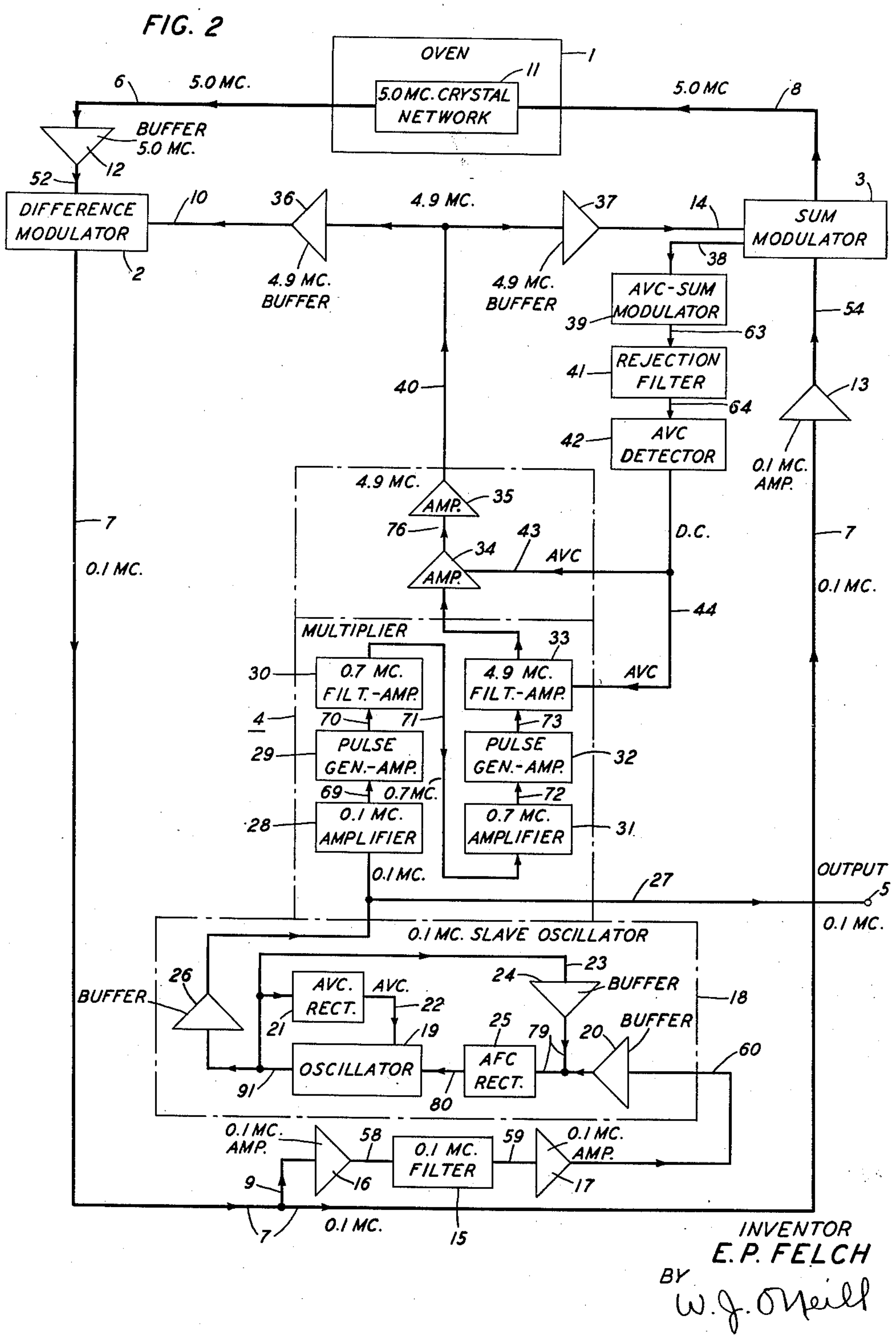
Fig. 2 is a functional block diagram similar to that shown in Fig. 1 but illustrating in more detail the components that may be utilized in a particular oscillation generator apparatus in accordance with this invention.
Figure 4:
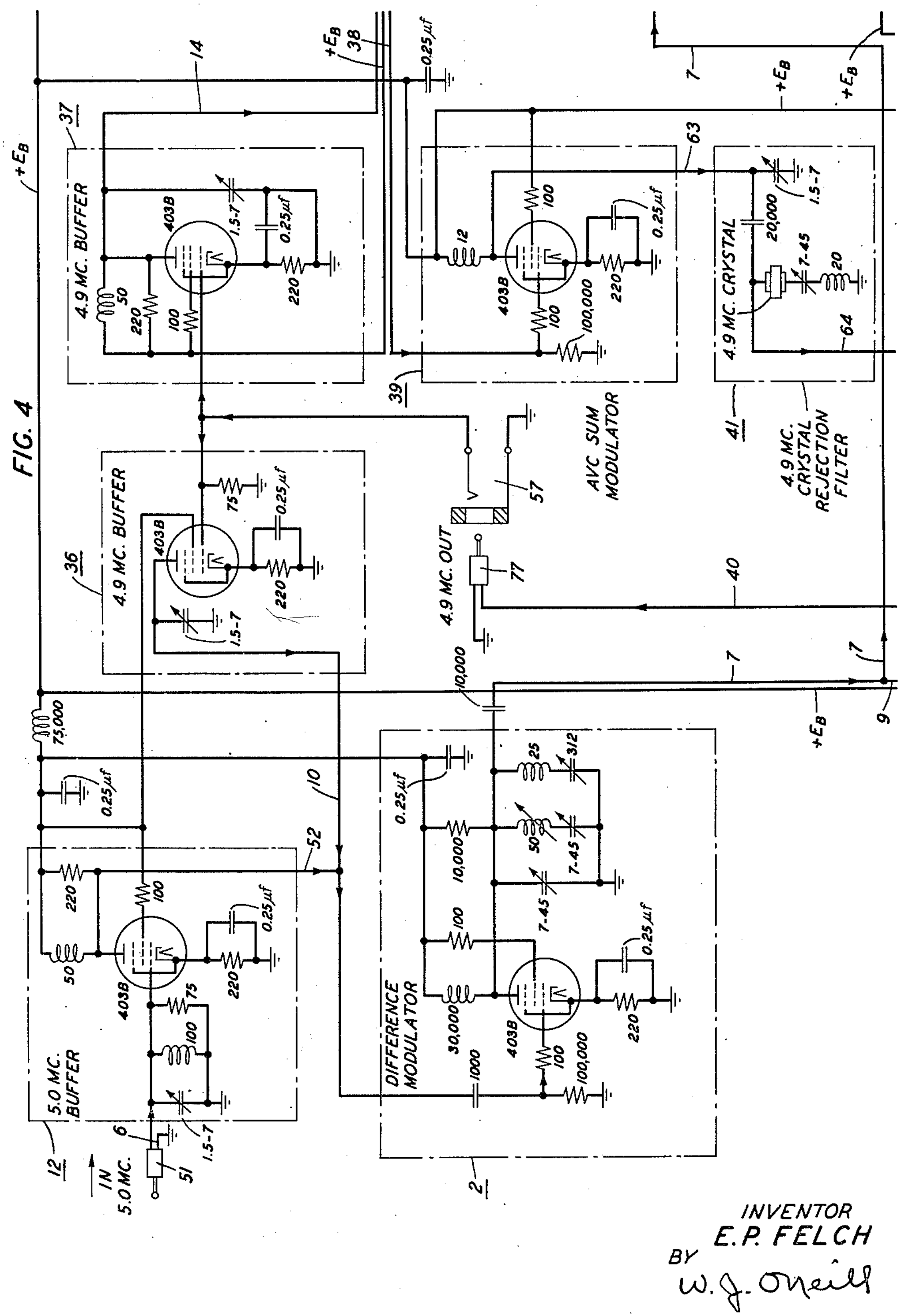
Figure 5:
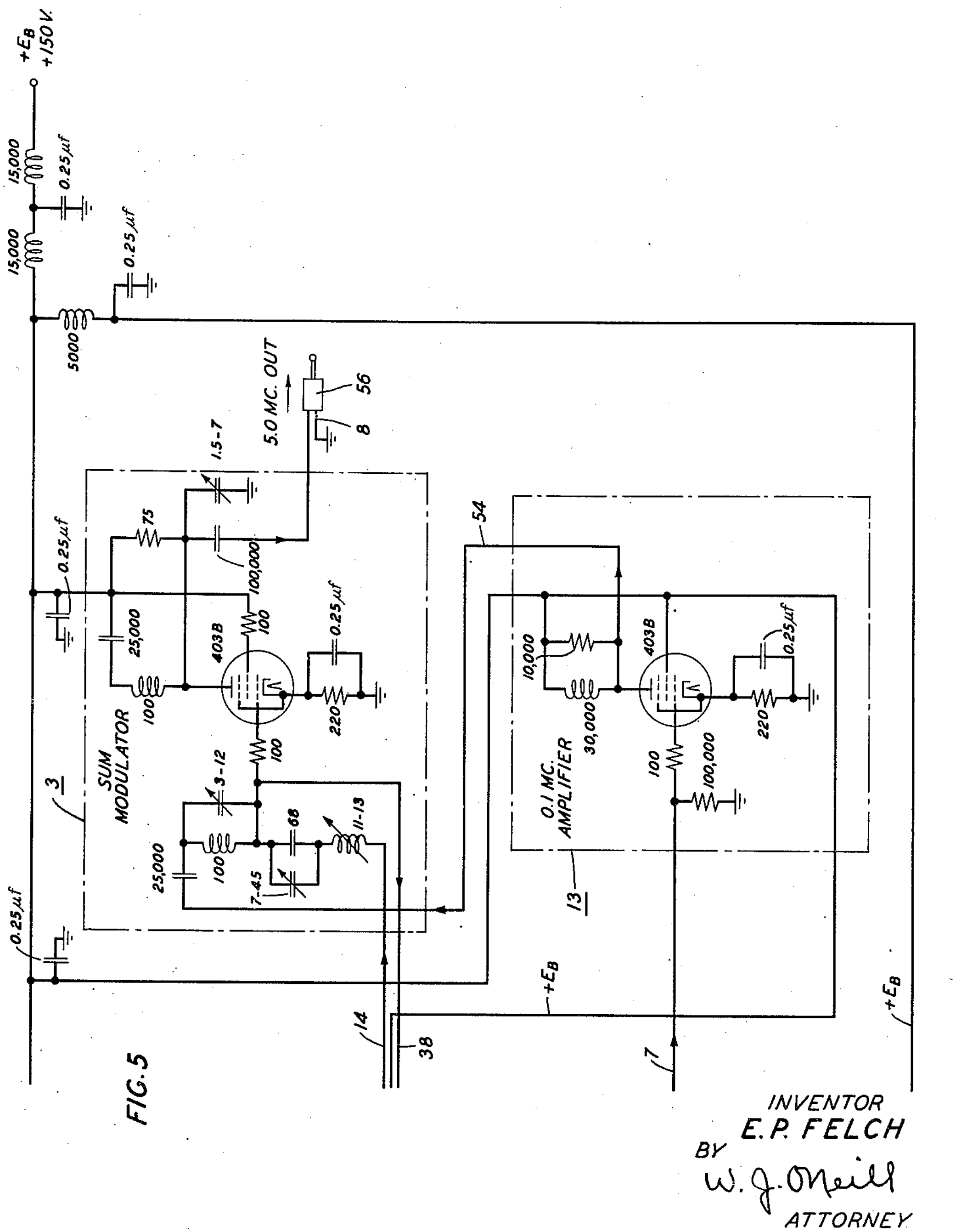
Figure 6:
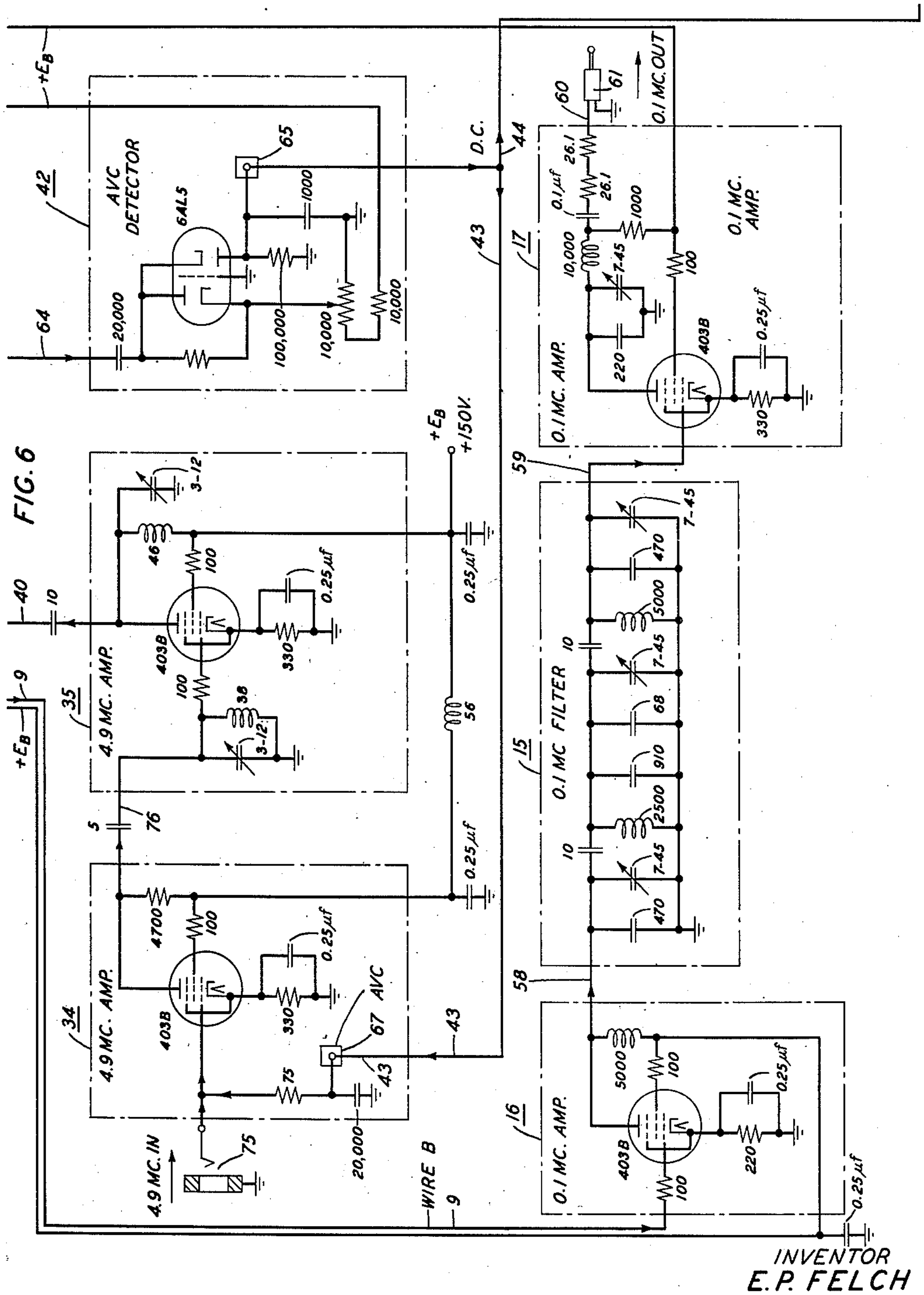
Figure 7:
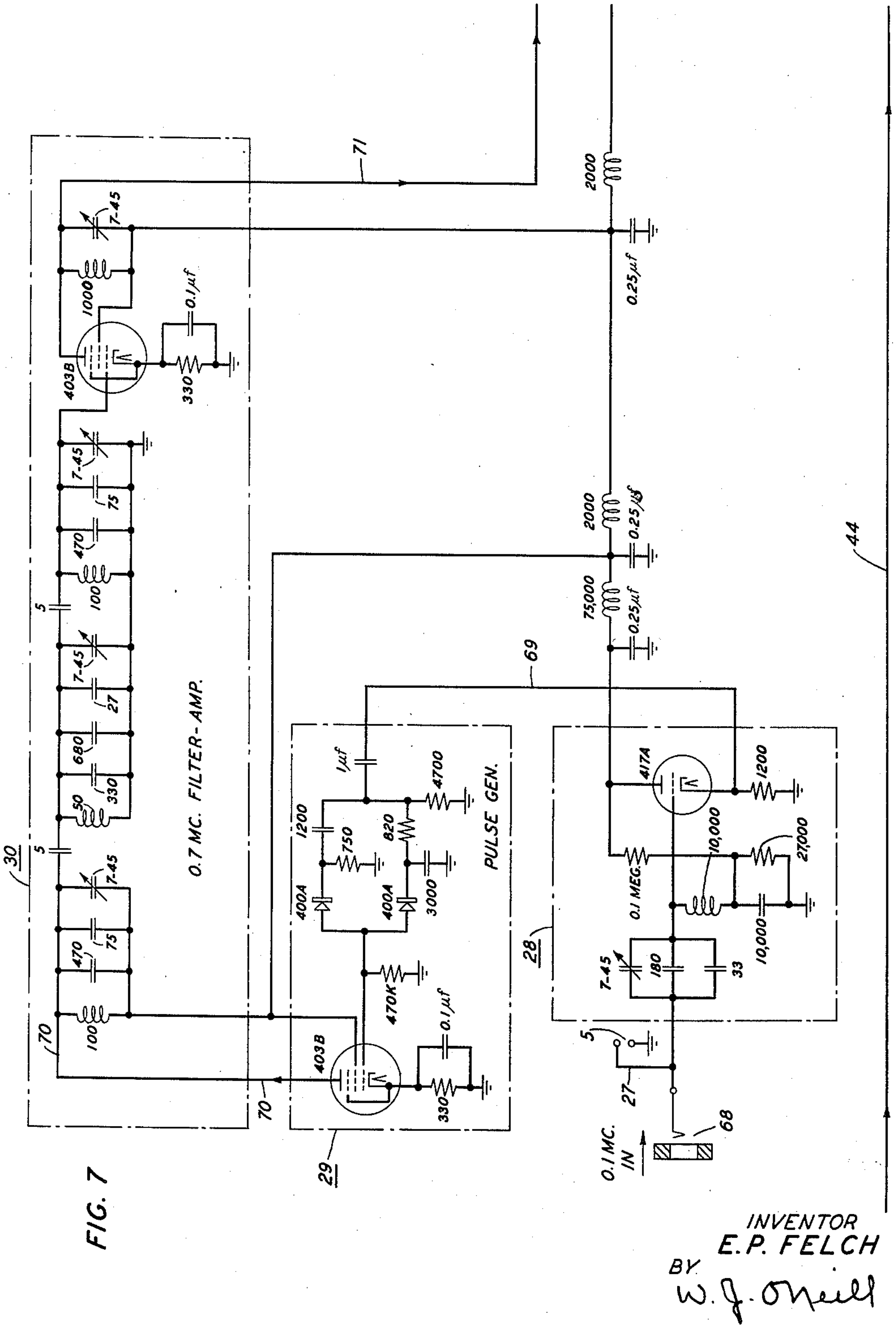
Figure 8:
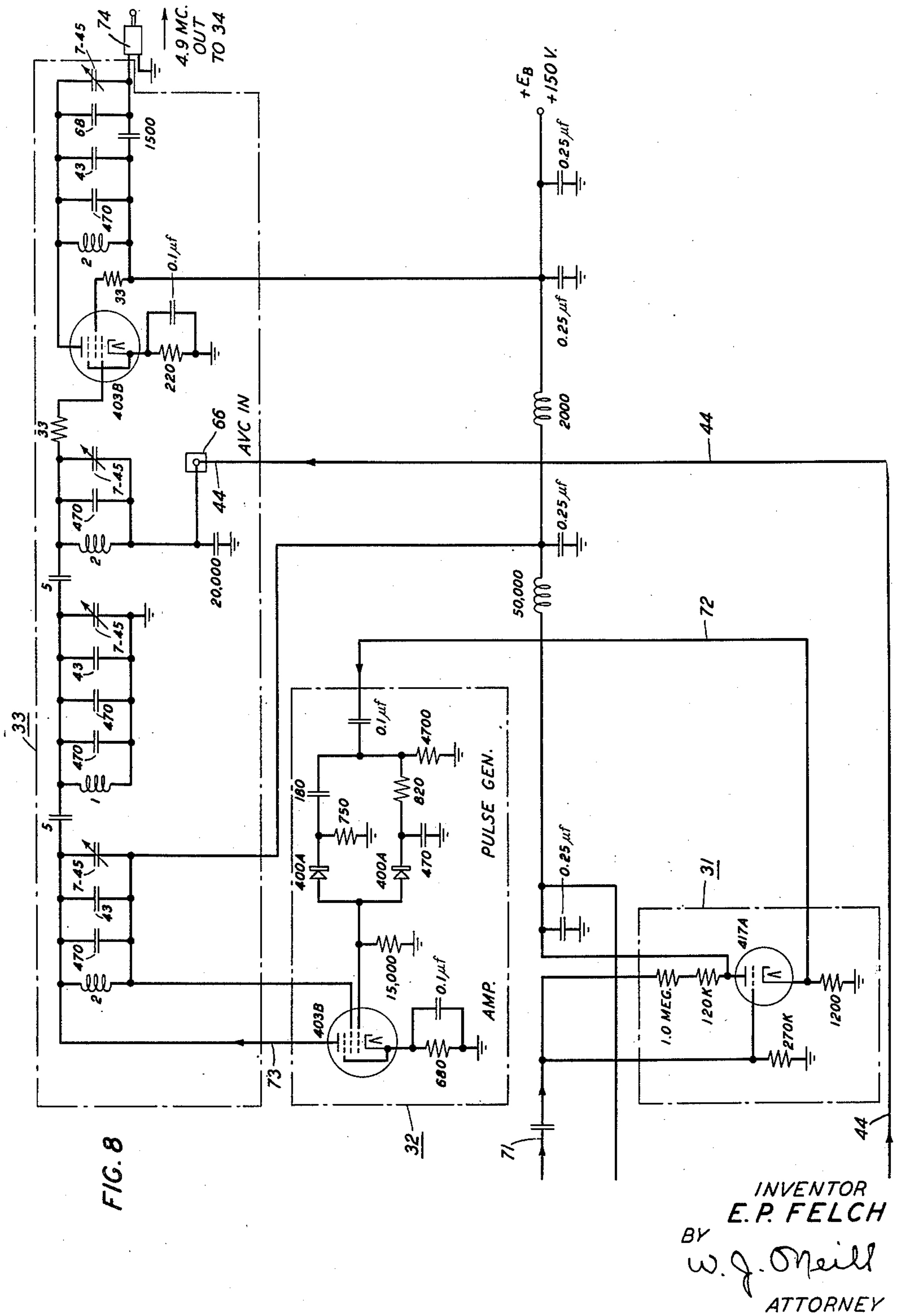
Figure 9:
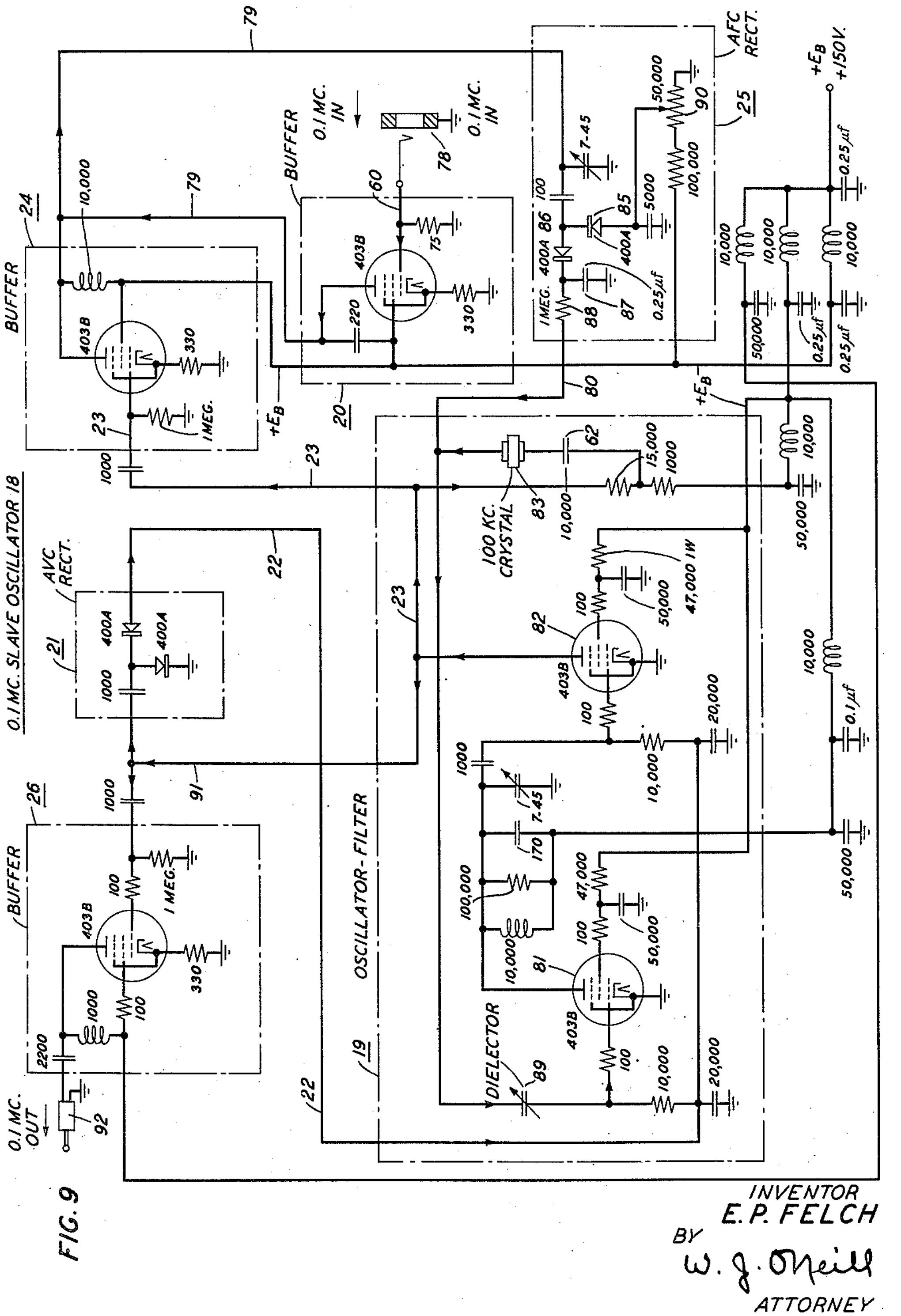

Figs. 3 to 9 are schematic circuit diagrams illustrating examples of circuit components that may be utilized to implement the various components shown in block diagram form in Fig. 2; Fig. 3 illustrating a crystal network component which for example may comprise a 5.0 megacycle per second piezoelectric crystal body. Figs. 4 and 5 illustrating a modulator-amplifier system comprising sum and difference modulators; Fig. 6 illustrating the automatic volume control detector, and heterodyne amplifiers thereby controlled, together with the take-off circuit of the heterodyne frequency generating branch; Figs. 7 and 8 illustrating a 0.1 to 4.9 megacycle frequency multiplier; and Fig. 9 illustrating a slave or controlled oscillator which may be used as a filter with the harmonic multiplier of Fig. 2, and Figs. 7 and 8 to prevent frequencies from the difference modulator of Figs. 2 and 4 from reaching the output circuit or affecting the heterodyne frequency generated by the harmonic multiplier; and Fig. 10 is a chart illustrating the arrangement of Figs. 4, 5, 6, 7 and 8.

Figure 1:
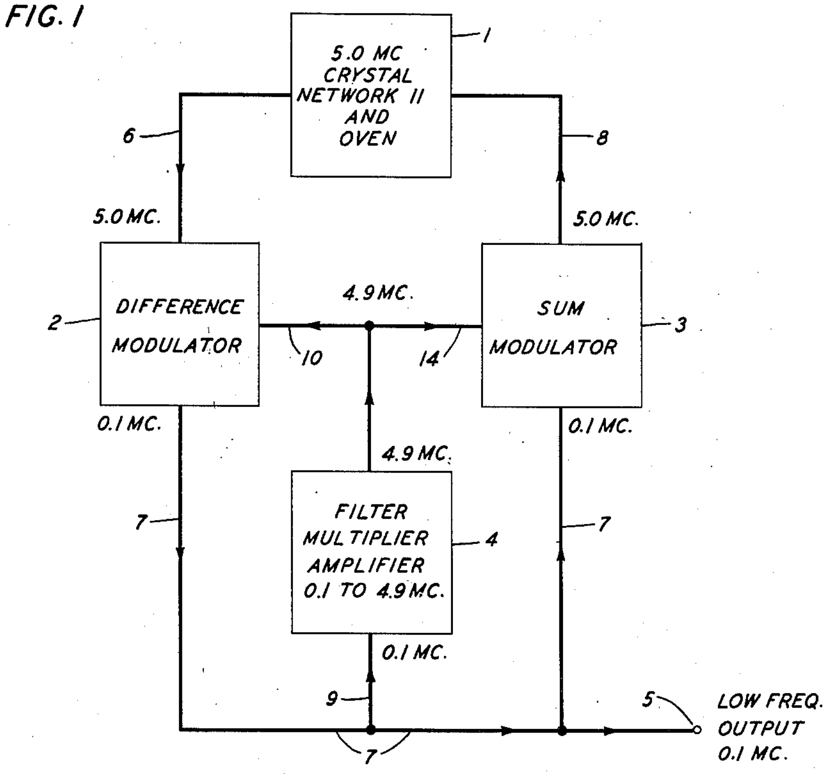
Fig. 1 is a block diagram illustrating in simplified form a crystal controlled oscillation generator apparatus in accordance with this invention.

Referring to the drawing, Fig. 1 is a simplified functional block diagram illustrating in basic form a crystal controlled oscillation generator system in accordance with this invention, as applied by way of example to a particular oscillator adapted to provide an output frequency of 0.1 megacycle per second controlled by a piezoelectric crystal unit having a resonant operating frequency of 5.0 megacycles per second.

As shown in Fig. 1, the oscillator apparatus may generally comprise a suitable series resonant type piezoelectric crystal body which may be provided with a suitable crystal network 11 and a temperature controlled oven as illustrated at 1; a detector or modulator or modulator-amplifier 2 comprising a difference modulator as illustrated at 2; a second detector or modulator or modulator-amplifier 3 comprising a sum modulator as illustrated at 3; a filter-multiplier-amplifier 4, and an output load circuit 5 for taking off and delivering oscillations which may be controlled by the higher frequency crystal body at 1.

The block diagram of Fig. 1 indicates the general relationship of the components which per se may be any suitable crystals, oscillators, modulators, amplifiers, and multipliers, etc., suitably interconnected, to practice applicant's invention. Fig. 1 illustrates various features of the invention. Specifically, as shown in Fig. 1, it is to be noted that the loop circuit starting from the output terminals of the crystal body at 1 contains in succession a conductor 6 carrying energy at the crystal resonant frequency which may be 5 megacycles per second (5.0 mc.), a modulator 2 which may be a difference modulator adapted to generate output energy at 0.1 megacycle per second (0.1 mc.) by beating with a heterodyne frequency such as 4.9 megacycles per second received over conductor 10, then a conductor 7 carrying such output energy at 0.1 megacycle per second, then a second modulator 3 which may be a sum modulator adapted for converting the 0.1 megacycle per second frequency back to the crystal frequency of 5 megacycles per second by beating with the same heterodyne frequency of 4.9 megacycles per second as received over conductor 14, and then conductor 8 completing said primary oscillating loop circuit for carrying the energy reconverted in frequency back to the input terminals of the crystal body at 1. Within the primary loop circuit 6, 7, 8, there is a second loop circuit 7, 9, 10 also under control of the 5 megacycle per second crystal body at 1. Starting at the difference modulator 2, the 0.1 megacycle per second output energy flows through the conductors 7 and 9 to a suitable combination at 4 of filters, amplifiers and frequency multipliers adapted to generate in conductor 10 energy for the heterodyne frequency voltage of 4.9 megacycles per second supplied to said difference modulator 2. This heterodyne frequency voltage is also supplied over conductor 14 to the sum modulator 3. The heterodyne frequency referred to may be generated at 4 in a single harmonic multiplier stage, or in several stages with whatever filters and amplifiers will give the desired purity and amplitude as would be recognized by one skilled in the art. If the heterodyne frequency selected is 4.9 megacycles per second, it may be conveniently generated at 4 in two successive stages each generating a seventh harmonic. If the heterodyne frequency selected is 5.1 megacycles per second, it may be generated in two stages giving multiplications of 3 and 17 times, respectively.

Fig. 2 shows a functional block diagram illustrating in greater detail a form of the invention adapted to provide an output at 5 of relatively low frequency such as 0.1 megacycle per second by way of example, controlled by a piezoelectric crystal at 11 having a higher resonant operating frequency such as 5.0 megacycles per second by way of example. As shown in Fig. 2, the output of the crystal network 11 mounted in oven 1 is connected to transmission circuit 6 carrying current at the crystal frequency, which may be 5.0 megacycles per second as an example, to the next element in the oscillation loop 11, 6, 2, 7, 3, 8 which element as shown in Fig. 2 may be a buffer amplifier 12 adapted for amplification and delivering current to modulator 2 which as shown in Fig. 2 may be a difference modulator 2. The heterodyne frequency current of 4.9 megacycles per second for example, coming in on conductor 10 causes a difference frequency to be generated in difference modulator 2 which may be 0.1 megacycle per second in the present example. This low frequency current flows in transmission circuit 7 which forms a part of said primary loop circuit, and may be amplified by amplifier 13 and delivered over conductor 54 to the second modulator 3 which may be a sum modulator where it may beat with the same heterodyne frequency coming in on circuit 14 as flows on conductor 10. The resulting sum frequency current, which may be 4.9 megacycles plus 0.1 megacycle or 5.0 megacycles per second in the present example and which is generated in sum modulator 3 then flows to the input terminals of crystal network 11 over transmission circuit 8 thereby closing the primary loop circuit 11, 6, 12, 2, 7, 13, 54, 3, 8, 11.

As shown in Fig. 2, the current of low frequency that is used to generate and control the heterodyne frequency in conductors 10 and 14, comes in on conductor 9 from conductor 7, and passes through conductors 58, 59, 60 where it is selected by filter 15 and is amplified by amplifiers 16 and 17. If the current after passing through filter 15 is not sufficiently purified, it may be further filtered as by a sharp filter 18 which as shown in Fig. 2 may comprise a controlled or slave oscillator 19. The control current transmitted toward the slave oscillator 19 from the amplifier 17 may be amplified further by buffer amplifier 20. If the output of the slave oscillator 19 does not remain suitably constant in amplitude, an automatic volume control circuit may be added comprising a rectifier 21 supplied with energy from the output 91 of the slave oscillator 19 and a control circuit 22 to conduct the control current back to the oscillator 19. If the frequency or phase of the slave oscillator 19 does not remain suitably constant, a control circuit 23 supplied from the output 91 of the slave oscillator 19 may feed into a buffer amplifier 24 from which the output is added to the control current from amplifier 20 and the combination supplied to an automatic frequency control rectifier 25 which controls the phase and frequency of the slave oscillator 19 as more fully described hereinafter.

The output of the slave oscillator 19 may be further amplified by an amplifier 26 from whence energy at the low frequency may be delivered to amplifier 28 and also to the load circuit 5 over conductor 27. From the amplifier 28 the low frequency current may pass to pulse generator-amplifier 29 as part of the multiplier-filter-amplifier system 4 to secure a pulse which when passed to amplifier-filter 30 permits of selection of a harmonic of the low frequency that in the particular example cited may be the seventh harmonic thereof or 0.7 megacycle per second. This harmonic may then pass through an amplifier 31 to a second pulse generator-amplifier 32 and to an amplifier-filter 33 where a harmonic of said harmonic is selected, giving for example the 49th harmonic of the low frequency, or 4.9 megacycles per second.

This final harmonic at 33 of the low frequency may if desired be further amplified by amplifiers 34 and 35, and then by a buffer amplifier 36 for delivery to the difference modulator 2 over conductor 10 as the heterodyne frequency. This harmonic or heterodyne frequency may also be passed to a buffer amplifier 37 for delivery over conductor 14 to the sum modulator 3 for converting the current arriving over conductor 7 back to the crystal frequency of 5 megacycles per second (5 mc.), for example, as mentioned above.

It may be desirable to regulate the amplitude of the current delivered over lead 8 to the crystal network 11 and to that end an automatic volume control may be utilized. One method, as illustrated in Fig. 2, is that of utilizing a modulator 39 with its grid parallel with the grid of the sum modulator 3 by lead 38 or otherwise connected so as to be excited by the same low frequency and by the same heterodyne frequency producing in the output the same sum and difference frequencies, such as 5.0 and 4.8 megacycles per second which will have amplitudes proportional to the currents of the same frequencies in lead 8. Also there may be, depending upon the modulator circuit utilized, frequencies of 4.9 mc. or 0.1 mc. or both. As shown in Fig. 2, a filter 41 may be inserted in the output lead of the modulator 39 to reject the undesired heterodyne frequency current arriving over lead 38 for thereby preventing singing around the loop including the amplifiers 34, 35 and 37, but passing the frequencies of 4.8 and 5.0 megacycles per second. The 4.8 and 5.0 megacycles frequencies may be rectified by the automatic volume control detector 42 and the control current delivered to control terminals of amplifiers 34 and 33 over leads 43 and 44 respectively.

The various individual units represented by block diagrams in Fig. 2 for the crystal network, amplifiers, modulators, filters, detectors, pulse generators, frequency and amplitude control circuits may be constituted of any suitable circuit components or by well known circuits known by these various names in the art, and may be connected as shown in Fig. 2, or in somewhat different order or manner in practicing this invention. The order or the connections may be dictated in many cases by the various characteristics of the various circuits, and the arrangement outlined in Fig. 2 may be constructed using such circuits or by using the circuits detailed in the following figures, Figs. 3 to 9.

Figs. 3 to 9 are circuit diagrams, illustrating by way of example, particular circuits that may be utilized for implementing the various components of like reference character shown in block diagram form in Fig. 2. Like reference characters in Figs. 3 to 9 represent like parts in Fig. 2. Particular frequencies have been selected by way of example. Also, particular values for circuit elements to suit the selected frequencies have been specified in Figs. 4 to 9, by way of example, to illustrate an example of a particular design with reference to Figs. 3 to 9.

Fig. 3 is a circuit diagram showing a crystal network 11 that may be used as the crystal network element 11 of Fig. 2, the crystal body 45 of Fig. 3 being a series resonant type high frequency piezoelectric body for controlling all frequencies in the oscillator. As shown in Fig. 3, the piezoelectric crystal body 45 may be connected in series with a variable capacitor 46 between an input terminal 49 and an output terminal 50 of the crystal network 11. The variable series capacitor 46 may be used to make small final adjustments of the operating frequency, though other means may be used. The input and output terminals 49 and 50 are represented in Fig. 3 as telephone jacks, though other types of terminals or connectors may be used. Resistances 47 and 48 of Fig. 3 may be used to establish fixed input and output impedances to the crystal network 11. The stray distributed capacities associated with the crystal body 45 electrodes and holder, capacitor 46 and wiring to ground are represented in dotted form in Fig. 3. The piezoelectric body 45 of Fig. 3 may comprise any suitable piezoelectric crystal resonant unit as dictated by the frequency to be generated and the stability to be secured. As an illustrative example, a suitable piezoelectric crystal body 45 for generating a frequency of 5 megacycles per second (5.0 mc.) for example, is one described by A. W. Warner, Jr. in the Proceedings of the Institute of Radio Engineers, September 1952, vol. 40, No. 9 under the title "High-frequency crystal units for primary frequency standards." The magnitudes of the resistances 47 and 48 of Fig. 3 depend upon the series resistance of the series resonant type crystal body 45 and the impedances of the associated leads 6 and 8 and may be matched and computed by well-known network methods.

Figs. 4 and 5 together show the remainder of the loop circuit as constituted by elements 6, 12, 2, 7, 13, 3, and 8 of Fig. 2, together with elements 36, 37, 39, 41. The high frequency crystal oscillations from the crystal network 11 of Fig. 3 enter on line 6 which is represented in Fig. 4 as terminated with a plug 51 for convenient connection with jack 50 of Fig. 3. The oscillations are transmitted over line 6 to buffer amplifier 12, which in Fig. 4 is shown as embodying a pentode or shield grid tube. This amplifier 12 operates at the crystal high frequency.

In Fig. 4, and the following figures the approximate values of resistances, inductances and capacities are indicated on the drawing with figures smaller than are used for reference characters, the magnitudes given being for operation with the indicated code marked tube, for an oscillator according to this invention in which the crystal body high frequency at 45 of Fig. 3 is 5.0 megacycles per second, the low frequency at 7, 9, 27, 5 of Fig. 2 is 0.1 megacycle per second, and the heterodyne frequency at 10, 14 is 4.9 megacycles per second secured by taking the seventh harmonic of the seventh harmonic of the low frequency of 0.1 megacycle per second. In Figs. 4 to 9, the resistances are expressed in ohms unless otherwise indicated in which case the letter "K" means thousands of ohms and "MEG" means millions of ohms. Small fixed capacities with simple figures and no notation are in micro-microfarads, large capacities are indicated by (µf.) microfarads, and variable capacities by the nominal range of the condenser in micro-microfarads. Inductances are indicated by figures showing microhenrys. The purpose of the detailed circuital elements and connections in the various block diagram stages of Figs. 4 to 9 will be understood by one skilled in the art; and changes to be made to operate at frequencies other than the frequencies used herein as a particular example, will be readily determined.

As shown in Fig. 4, the incoming wave (5.0 mc.) on line 6 of Fig. 4 after amplification by the buffer amplifier 12 is delivered over line 52 to a grid of the pentode of the difference modulator 2. The beating or heterodyne frequency (4.9 mc.) from buffer amplifier 36 may also be delivered to the difference modulator 2 over lead 10. The low frequency (0.1 mc.) thereby produced by beats in the difference modulator 2 between the two supplied waves (5.0 mc. and 4.9 mc.) passes over line 7 to amplifier 13 of Fig. 5 and also to amplifier 16 of Fig. 6 over leads 7 and 9. From amplifier 13 of Fig. 5 the amplified low frequency current (0.1 mc.) passes over lead 54 to the sum modulator 3. The sum modulator 3 also receives on its input circuit the beating frequency wave (4.9 mc.) over line 14 from buffer amplifier 37 of Fig. 4. The sum beat frequency (5.0 mc.) generated in the sum modulator 3 then passes to the crystal network 11 of Fig. 3 over line 8 shown in Fig. 5 as connected to plug 56 for connection to the jack 49 of the crystal network 11 in Fig. 3. The beating frequency (4.9 mc.) from the harmonic generator 4 of Fig. 2 is shown in Fig. 4 as coming in on jack 57 by a plug connection 77 and line 40 from the output line 40 of Fig. 6 and in Fig. 4 it passes to the inputs of the buffer amplifiers 36 and 37.

As shown in Fig. 4, lead 9, taking off from lead 7 of Fig. 4 carries low frequency current (0.1 mc.) to the input of amplifier 16 of Fig. 6 wherein the low frequency current after amplification passes over lead 58 to filter 15, thence over lead 59 to amplifier 17, and thence over lead 60 and plug 61 of Fig. 6 to the input of the filter or slave oscillator 18 shown at jack 78 of Fig. 9.

As shown in Fig. 5, the low frequency (0.1 mc.) and beating frequency (4.9 mc.) energies transmitted over leads 54 and 14 respectively to sum modulator 3 may be taken off near the grid of sum modulator 3 of Fig. 5 and transmitted over lead 38 of Fig. 5 to the input of automatic volume control sum modulator 39 of Fig. 4. The high frequency produced therein is transmitted over lead 63 to filter 41 designed to attenuate markedly the 4.9 mc. beating frequency coming into the AVC sum modulator 39 thereby to avoid generation of sustained oscillations around the loop 39—41—42—43—34—35—37—38—39 shown in Fig. 2 at the beating frequency (4.9 mc.). The filter 41 is shown in Fig. 4 as a crystal filter, but any suitably sharp frequency rejection filter may be used. The high frequencies produced in the modulator 39 of Fig. 4 after passing through the filter 41 of Fig. 4 pass over lead 64 to automatic volume control detector 42 of Fig. 6, where they are rectified. Variations in amplitude of the high frequencies coming out of the modulator 39 of Fig. 4 will correspond with variations in the same high frequencies coming out of the sum modulator 3 of Fig. 5 and will appear as variations in rectified current at terminal 65 of Fig. 6 leading over lead 43 of Fig. 6 to terminal 67 of amplifier 34 of Fig. 6, and over lead 44 to terminal 66 of amplifier 33 in Fig. 8 for controlling the amplification of said amplifiers 34 and 33 respectively.

Low frequency energy (0.1 mc.) from amplifier 17 of Figs. 2 and 6 on the lead 60 may be transmitted directly to harmonic generator 4 of Fig. 2, if of sufficient purity, by connecting plug 61 of Fig. 6 to input jack 68 of amplifier 28 of Fig. 7. If not of sufficient purity, additional filtering may be interposed by inserting a filter 18 of Figs. 2 and 9 between terminals 61 of Fig. 6 and 68 of Fig. 7, as more fully described hereinafter.

In Fig. 7, the low frequency wave (0.1 mc.) enters terminal 68 passing to amplifier 28, thence over lead 69 to pulse generator-amplifier 29 which may be any suitable generator of harmonics of the incoming low frequency wave. The harmonic generator system comprising the pulse generator 29 shown in Fig. 7 is disclosed and claimed in an application Serial No. 375,222 filed August 19, 1953, by F. G. Merrill et al., now U. S. Patent No. 2,748,283 dated May 29, 1956. The output of the pulse generator-amplifier 29 of Fig. 7 is transmitted over lead 70 to filter-amplifier 30, which may be of any suitable design, to select and amplify any suitable harmonic of the low frequency (0.1 mc.), such as the seventh harmonic (0.7 mc.) of the low frequency (0.1 mc.). It will be noted that, as disclosed in the Merrill et al. application referred to above, the harmonic generator system shown in Fig. 7 is of the type employing a phase shift pulse generator 29 wherein the pulses are obtained by providing a pair of sine waves from the applied single phase input sine wave oscillations, phase-shifting the pair of sine waves with respect to each other to provide portions thereof corresponding to desired triangular shaped pulses, and filtering the desired harmonic from the pulses by means of filter 30. The output of filter 30 of Fig. 7 passes over lead 71 to the grid of amplifier 31 of Fig. 8, and thence over lead 72 to a second pulse generator-amplifier 32 which may be of any suitable design. The pulse generator-amplifier shown at 32 in Fig. 8 is similar to that shown at 29 of Fig. 7. The output of the second pulse generator-amplifier 32 passes over lead 73 to a second filter amplifier 33 for selecting a suitable harmonic of the harmonic wave (0.7 mc.) impressed on the pulse generator-amplifier 32. For example, filter-amplifier 33 may select the heterodyne frequency (4.9 mc.) which is the seventh harmonic of the seventh harmonic of low frequency (0.1 mc.). The output (4.9 mc.) of filter-amplifier 33 of Fig. 8 passes out terminal 74 of Fig. 8 to the input terminal 75 of amplifier 34 of Fig. 6 to which it is to be connected by the respective plug and jack. Filter-amplifier 33 of Fig. 8 possesses at 66 input terminals for the automatic volume control current arriving on lead 44 of Figs. 8, 7, and 6 from terminal 65 of Fig. 6 to which it is connected.

Fig. 6 shows amplifier circuits 34 and 35 that may be used for the amplifiers 34 and 35 of Fig. 2. The harmonic output (4.9 mc.) of filter-amplifier 33 of Figs. 2 and 8 coming in on terminal jack 75 of Fig. 6 is amplified by amplifier 34 of Fig. 6 and passes out on lead 76 to the input of amplifier 35 of Fig. 6. Amplifier 34 of Fig. 6 has automatic volume control terminal 67 for connection with lead 43 of Fig. 6 for receiving from terminal 65, Fig. 6, the automatic volume control current from detector 42 of Fig. 6 for controlling the amplification of amplifier 34 of Fig. 6. The output (4.9 mc.) of amplifier 35 of Fig. 6 is transmitted over lead 40 of Figs. 6 and 4 through terminal plug 77 of Fig. 4 to input jack 57 of Fig. 4 for supplying to buffer amplifiers 36 and 37 of Fig. 4 the harmonic beating frequency current (4.9 mc.) generated in the frequency multiplier 4 of Figs. 2, 7, 8. From amplifiers 36 and 37, of Fig. 4, voltage of the same beat frequency is supplied to both the difference and sum modulators 2 and 3 over leads 10 and 14 respectively, the heterodyne frequency being in the present example 4.9 mc. for beating down the high frequency wave of 5.0 mc. to 0.1 mc. in the difference modulator 2 of Fig. 4, and beating of the low frequency wave of 0.1 mc. to 5.0 mc. in the sum modulator 3 of Fig. 5.

Fig. 9 is a circuit diagram showing a crystal slave oscillator having both amplitude and frequency control that may be used as a filter in block 18 of Fig. 2. When so used, the plug terminal 61 of Fig. 6 is connected to jack terminal 78 of Fig. 9 for delivering to buffer amplifier 20 the low frequency current (0.1 mc.). The amplified output from buffer 20 is delivered over lead 79 to automatic frequency control rectifier 25 whose action is described below and over lead 80 to the slave oscillator 19 which may comprise a two-stage amplifier 81, 82 and a piezoelectric body 83 resonant at the low frequency (0.1 mc.). The frequency of the slave oscillator 19 is controlled by the resonance of piezoelectric body 83 in series with capacitor 62 and with dielector 89. This series resonant circuit is connected between the output of amplifier 82 and the input of amplifier 81 and forms the feedback circuit thereof whereby the slave oscillator 19 operates at the low frequency, for example 0.1 mc., and functions as an efficient or sharp filter. One output of the filter 19 passes over lead 23 to buffer amplifier 24 whose output is added to the output from amplifier 20 on lead 79 to the input of automatic frequency control rectifier 25. The sum of the two waves of the same frequency is a resultant which will change in magnitude if the phase relation between them changes. If the frequency of oscillator 19 should change, a phase change will result so long as the frequency difference persists. The resultant impressed on rectifiers 85 and 86 of AFC rectifier 25 will produce a potential change on capacitor 87 thereof which is impressed through resistor 88 and lead 80 upon dielector 89 whose capacitance changes with a change in direct current applied potential. The change in capacitance of dielector 89 will change the resonant point of the series combination 62, 83, 89 thereby changing the frequency of the slave oscillator 19 until its phase with respect to the phase of the current from buffer amplifier 20 ceases changing which will occur only when the two frequencies are identical.

A dielector such as barium strontium titanate may be used for element 89 of oscillator 19, but other dielectors may also be used. The desired phase relation mentioned above at which it is desired the circuit operate may be varied by means of potentiometer 90 of AFC rectifier 25 that applies a controllable bias to rectifiers 85 and 86 thereof. In this circuit as shown in Fig. 9, either dielector 89 may be slightly conductive, or rectifiers 85 and 86 may be slightly conductive in the reverse direction. If neither possesses this conductive property, a very high resistance leak may shunt one or the other. Germanium rectifiers (400 A) may be used directly for elements 85 and 86 in automatic frequency control rectifier 25, as well as for rectifiers in automatic volume control rectifier 21 mentioned below.

As shown in Fig. 9, a second output connection from oscillator 19 and amplifier 82 thereof is lead 91 which supplies energy to automatic volume control rectifier 21 and also to outgoing buffer amplifier 26. The rectified current from the output of automatic volume control rectifier 21 passes over lead 22 and controls the bias on the input of both tubes 81 and 82 of oscillator 19. The output from buffer amplifier 26 is transmitted over output terminal plug 92 to input jack 68 of Fig. 7 and also over lead 27 to the output load circuit 5.

The amplification in the primary loop circuit 11, 6, 12, 2, 7, 13, 54, 3, 8 necessary for the generation of oscillations in the oscillation circuit may be supplied by modulator 2 or 3 or amplifier 12 or 13 or any suitable combination thereof.

As disclosed in the example given, the crystal unit 45 of Fig. 3 provides substantially zero phase shift but as an alternative in practicing this invention, a phase shift in one element may be cancelled by a corresponding phase shift in another element by alterations in the circuits by means well known per se in the art. For good frequency stability, phase stability in various parts of the loop is desirable. As is well known in the art, designing various stages with load impedances lower than the output impedances of the tubes contributes to small phase shifts with time and other changes. The phase shift contributed by elements within the primary oscillator loop should be made very small with time and other changes. Phase shifts in the circuit producing the beating frequency voltage is less important as the same heterodyne wave is impressed on both sum and difference modulators 2 and 3 and any shift produced thereby in one modulator due to phase shift in the heterodyne frequency will be cancelled by the shift produced in the other modulator.

While in Figs. 3 to 9, the circuits have been described with reference to a particular set of frequencies, it will be understood that other frequencies may also be utilized by making a suitable choice of circuit component elements and values. Also, while in Figs. 3 to 9 particular circuits and circuit elements have been shown and described, it will be understood that other suitable circuits and circuit elements may be utilized for implementing the components shown in block diagram form in Fig. 2. Also, while in Fig. 2 particular block diagram components have been shown and described, it will be understood that other suitable components may be utilized therein for implementing the circuits of Fig. 2 and Fig. 1.

Although this invention has been described and illustrated in relation to specific arrangements, it is to be understood that it is capable of application in other organizations and is therefore not to be limited to the particular embodiments disclosed.

What is claimed is:

1. An oscillation generator comprising in combination a piezoelectric crystal having input and output terminals, a first amplifier connected to said output terminals, a difference modulator connected to said first amplifier, a loop circuit for a difference frequency having one end connected to said difference modulator, a second amplifier connected in said loop circuit, a sum modulator connected to the outer end of said loop circuit, a connection from said sum modulator to said input terminals of said piezoelectric crystal, a third amplifier connected to said loop circuit at a point therein intermediate said difference and sum modulators, a filter for said difference frequency connected to said third amplifier, a fourth amplifier connected to said filter, an automatic frequency control rectifier connected to said fourth amplifier, a slave oscillator for said difference frequency connected to said automatic frequency control rectifier, a fifth amplifier connected to said slave oscillator and to said automatic frequency control rectifier, an automatic volume control rectifier connected to said slave oscillator, a sixth amplifier connected to said slave oscillator, a first pulse generator and amplifier system connected to said sixth amplifier, a first amplifier and filter system connected to said first pulse generator and amplifier system, a seventh amplifier connected to said first amplifier and filter system, a second pulse generator and amplifier system connected to said seventh amplifier, a second amplifier and filter system connected to said second pulse generator and amplifier system, an eighth amplifier connected to said second pulse generator and amplifier system, connections from said eighth amplifier to said difference modulator and to said sum modulator, a volume control second sum modulator connected to said first sum modulator, an automatic volume control detector connected to said second sum modulator, and connections from said automatic volume control detector to said second amplifier and filter system and to said eighth amplifier.

2. An oscillation generator comprising a positive feedback loop circuit, frequency selective means in said loop circuit for passing a primary frequency signal which is produced therein, means in said loop circuit for combining said primary frequency signal passed by said selective means with an auxiliary frequency signal produced within said loop to produce a difference frequency signal, means in said loop circuit for combining said difference and auxiliary frequency signals to produce said primary frequency signal, means responsive to said difference frequency signal for producing said auxiliary frequency signal, amplifying means in said loop circuit to provide sufficient amplification to sustain said signals in their respective portions of said loop, and means making said difference frequency signal available as an output signal from said generator.

3. An oscillation generator in accordance with claim 2 wherein said frequency selective means comprises a piezoelectric crystal.

4. An oscillation generator in accordance with claim 3 wherein said means for combining said primary frequency signal with said auxiliary frequency signal comprises a difference heterodyne modulator, and said means for combining said difference frequency signal with said auxiliary frequency signal comprises a summation heterodyne modulator.

5. An oscillation generator in accordance with claim 4 wherein said means responsive to said difference frequency signal comprises harmonic generator means, whereby the frequency of said difference frequency signal is a subharmonic of the frequency of said primary frequency signal and the frequency of said auxiliary frequency signal is a harmonic of the frequency of said difference frequency signal.

6. An oscillation generator of the positive feedback loop circuit type wherein said loop circuit comprises a frequency selective circuit comprising a piezoelectric crystal, said circuit having an input and an output, first frequency converting means having two inputs and one output, connecting means joining one of said inputs of said first frequency converting means to said output of said circuit, second frequency converting means having two inputs and one output, second connecting means joining one of said inputs of said second frequency converting means to said output of said first frequency converting means, third connecting means joining said output of said second frequency converting means to said input of said circuit, frequency multiplying means having an input and an output, fourth connecting means joining said input of said multiplying means to said second connecting means, fifth connecting means joining said output of said frequency multiplying means to the other inputs of said first and second frequency converting means, amplifying means located in at least one of said connecting means to provide sufficient amplification to sustain in each portion of said generator an oscillation having a frequency dependent upon said frequency selective circuit, and an output circuit connected to said second connecting means.

7. An oscillation generator in accordance with claim 6 wherein said first frequency converting means comprises a difference heterodyne modulator and said second frequency converting means comprises a summation heterodyne modulator.

8. An oscillation generator in accordance with claim 7 wherein said frequency multiplying means comprises harmonic generator means, whereby the frequency of the signal from said output of said difference modulator in a subharmonic of the resonant frequency of said frequency selective circuit and the frequency of the signal from said output of said harmonic generator is the difference between said resonant frequency and said frequency of said signal from said difference modulator.

References Cited in the file of this patent

UNITED STATES PATENTS

| | | |
|---|---|---|
| 1,604,140 | Affel | Oct. 26, 1926 |
| 2,558,100 | Rambo | June 26, 1951 |
| 2,595,608 | Robinson et al. | May 6, 1952 |
| 2,614,211 | Goodall | Oct. 14, 1952 |

OTHER REFERENCES

"The Atomic Clock" in Radio and Television News-Radio-Electronic Engineering Edition, vol. 41, No. 3, March 1949, pages 14, 28 to 29.